April 29, 1947.  V. GUILLEMIN, JR  2,419,682
ELECTRO-CARDIO-TACHOMETER
Filed Feb. 11, 1942
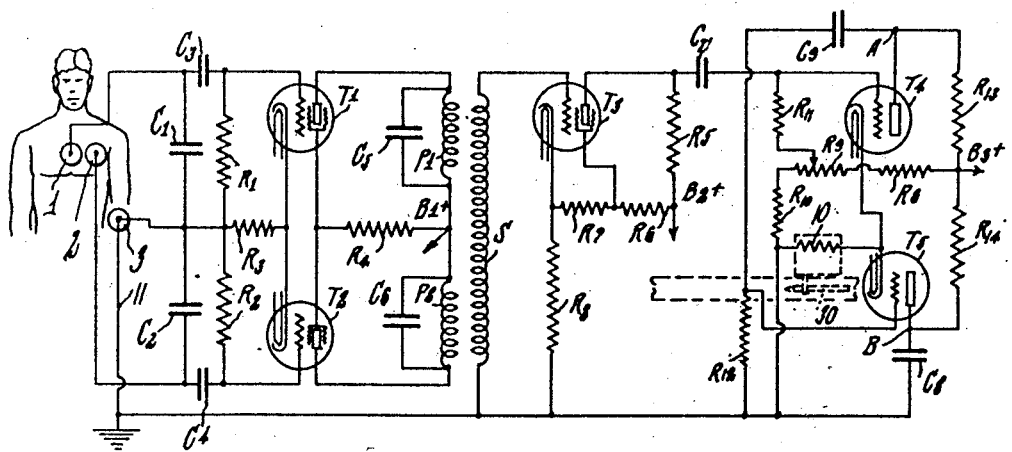
Fig. 1.
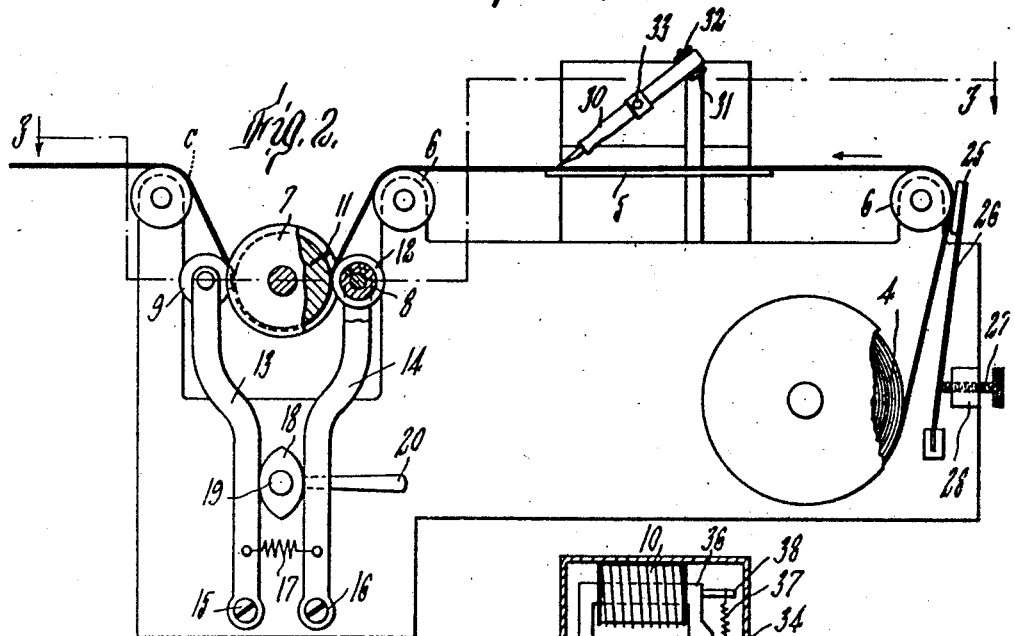
Fig. 2.
Fig. 3.
Inventor
Victor Guillemin, Jr.
by Wright, Brown, Quinby & May
Attys.

Patented Apr. 29, 1947

2,419,682

UNITED STATES PATENT OFFICE 2,419,682

ELECTROCARDIOTACHOMETER

Victor Guillemin, Jr., Dayton, Ohio

Application February 11, 1942, Serial No. 430,393

6 Claims. (Cl. 128—2.06)

This invention has for its object to provide an apparatus by which there is made an objective record of the heart rate of man and animals, both at rest and during exercise. It uses for this purpose the brief pulse of electrical potential occurring at the subject's chest at each heart beat.

The apparatus consists essentially of two parts: (1) an electronic amplifier to increase the power derived from the electrical potential pulses, and (2) an indicator or recorder by which the heart rate may be made visible or a record made of it. For the first part an amplifier is employed designed to amplify electrical impulses derived from the heart action while suppressing electrical impulses derived from other sources both from within the body and external thereto. For the second part there is shown here a recorder by which a permanent record of the heart rate may be made.

For a complete understanding of this invention, reference may be made to the accompanying drawings in which Figure 1 is an electrical diagram of an apparatus embodying the invention.

Figure 2 is a somewhat diagrammatic view partly in side elevation and partly broken away of a recording apparatus.

Figure 3 is a sectional view on line 3—3 of Figure 2.

The amplifier

A diagram of the amplifier is shown in Figure 1. The actuating heart impulses are picked up by a pair of electrodes 1 and 2 attached to the subject's chest near to the heart, while a third electrode 3, which is a grounding electrode, may be placed at any convenient place on the body.

Leading from the electrodes 1 and 2 is a broadly tuned in-put circuit designed to eliminate some of the undesirable frequency components coming from the active potentials of the skin and skeletal muscles and from interfering sources outside the subject. This in-put circuit comprises the condensers C1, C3 and resistor R1 for the electrode 1 and the corresponding condensers C2, C4 and resistor R2 for the electrode 2. The in-put circuit from the electrode 1 is connected to the grid of the amplifying tube T1, while the in-put circuit for the electrode 2 is similarly connected to the grid of the amplifying tube T2, these amplifying tubes herein shown as tetrodes, having a common cathode resistor R3 and a common series grid resistor R4. These components serve to partially suppress pulses arriving at the grids of both tubes in-phase, but do not suppress pulses that are opposite in phase, as these do not change the total current through R3 and R4. In-phase pulses are further suppressed by the action of an audio transformer whose two primaries P1 and P2 are wound opposed so that a like change of current in both does not cause any induced potential in the secondary winding S.

The primaries P1 and P2 are arranged in parallel with condensers C5 and C6, respectively, which form two parallel resonant circuits, which are respectively the plate loads of the tubes T1 and T2. These tubes T1 and T2 are chosen to have high impedance plate circuits so that their power out-put to the load is very small, except for the narrow band of frequencies near the resonance frequency of the plate loads, this frequency being chosen as that of the electrical impulses developed by the heart muscle which are different from those developed by those of other muscles of the body. The result of this arrangement is that the circuit up to and including the audio transformer secondary S is highly selective and eliminates undesirable components very effectively. The discrimination against in-phase pulse eliminates all potential pulses coming either from within the subject's body or picked up by his body from external interfering sources of potential that affect both electrodes 1 and 2 simultaneously. The heart beat impulse being out of phase at 1 and 2 is transmitted to the secondary S greatly amplified.

As shown a succeeding stage of amplication is employed, using the tube T3, and this may be any conventional type which will amplify the proper frequency band. It is shown here as a tetrode with screen grid and cathode potentials obtained from the bleeder circuit having the resistor components R6, R7 and R8 and is resistance-capacity coupled to the out-put stage, as by the resistance R5 and the capacity C7. This resistance-capacity coupling acts to change the monophasic or unidirectional pulse, which the preceding circuit selects out of the heart beat potential, to a diphasic pulse, so that no matter what the original direction of pulse derived from the heart beat, there will be a pulse transmitted in the proper direction (negative) to actuate the out-put circuit, as will later appear. This avoids the necessity of employing a rectifier or a manually operated reversing switch, in the in-put circuit.

The out-put circuit comprises the two triodes T4 and T5 and is of a type known as multi-vibrator, or trigger, or double reverse coupled circuit, that is, with no amplified heart pulses coming through the condenser C7, the grid of T4 is held positive with respect to its cathode by being connected to the proper point on the bleeder circuit having the resistor components R8, R9 and R10. The tube T4 would then have a very low impedance compared to resistor R13, which is interposed between the plate or anode of the tube T4 and the anode potential source at B3. The load 10 is interposed between the common cathode of the tubes T4 and T5 and the ground. This load will be further described, but its impedance is small compared to that of the component R13. Therefore, the point A is only slightly above ground potential. The grid of the tube T5, however, is negative with respect to its cathode, the latter being positive with respect to ground due to the potential drop across the load 10. Therefore the impedance of the tube T5 is high relative to that of resistor R14 and point B is of high potential and the large condenser C8 is charged nearly to the full plate potential supply voltage applied at B3.

The normal equilibrium condition is upset by a sufficiently strong pulse of negative potential impressed on the grid of the tube T4 from the amplifier circuit through the coupling condenser C7. Such a pulse increases the impedance of the tube T4, thus causing a rise of potential at the point A. This is transmitted through the condenser C9 to the grid of the tube T5, causing a sudden increase of current from the condenser C8 through the tube T5 and the load 10 to ground. This raises the potential of the cathode of T5 of the tube T4, thus further increasing the impedance of the tube T4 and enhancing the effect at the grid of the tube T5. This action continues until the point A is practically at the potential of the anode supply voltage at B3. During this time the large condenser C8 discharges its store of energy through the load 10 to ground. Thereafter the charge on the grid of the tube T5 passes off through the resistor R12 and the large condenser C8 recharges through the resistor R14 and the circuit is back to normal.

The threshold value of the pulse required to "trigger off" the out-put circuit may be adjusted by moving the slider on the voltage divider R9. Any interfering potentials below this threshold value will be rejected. This tends further to eliminate fortuitous potential variations, not caused by heart action, from actuating the recorder.

The marked success of the apparatus in determining, registering, and recording the time rate of heart beats without disturbances arising from other potential effects of the body, even though the body is undergoing violent exercise, and without disturbances arising from potential variations arising outside of the body, depends upon the combined action of three components. (1) The push-pull in-put circuit is principally effective in suppressing disturbing potentials from external sources but also suppresses some of the muscle and skin potential variations. (2) The sharply tuned circuit which selects a particularly narrow band of frequencies, further suppresses external disturbances but serves mainly to eliminate the skin and skeletal muscle potential variations. (3) The trigger out-put circuit suppresses all disturbing potentials that get by (1) and (2) no matter how numerous or closely spaced or energetic these may be, the out-put circuit not being affected at all so long as none of these potentials has an instantaneous peak value equal to or greater than those derived from the desired heart potential pulses.

This circuit requires only one reverse coupling component, a condenser C9, the reverse coupling from the tube T5 to the tube T4 being via the common cathode. The load is advantageously placed so that one terminal is always at ground potential, being shown as connected thereto through the lead 11. The violent changes of potential occurring in the out-put circuit are not coupled back to the previous stages, except through the very small cathode to grid capacitance of the tube T4. This is of great importance as it avoids unwanted oscillations in the prior stages and produces superior stability. Components R14 and C8 are not essential to the operation. They do, however, prevent a sudden increase of current drain from the anode potential source B3. It is therefore possible to obtain stable operation of the whole circuit with only a single power supply for the points B1 for the tubes T1 and T2, B2 for the tube T3, and B3 for the tubes T4 and T5.

*The recorder*

In Figures 2 and 3 is shown a recorder which may be operated from the trigger circuit to give visible record of the rate of heart beat. A paper tape as unrolled from the roll 4, passes over a table 5 which may be provided with any suitable guides to keep the paper in place. At the ends of the table are spaced rollers 6, from the second of which the paper is directed around the flanged pulley 7 against which it is held by a pair of rollers 8 and 9. The pulley 7 is fitted with a marking prong 11 which registers with grooves 12 cut into the faces of the rollers 8 and 9. This pulley 7 is driven by any suitable means as through a pulley 10 and belt 71 at a constant speed, say, at one revolution per second, and the prong 11 thus pricks time marks upon the tape at regular intervals. The rollers 8 and 9 are carried by levers 13 and 14, respectively, fulcrumed at 15 and 16, the rollers being pressed toward the pulley 7 as by means of a spring 17 having its ends connected thereto. A rocker cam 18, positioned between the levers 13 and 14 and rotated about a shaft 19 by the handle 20 through an angle of 90° from the position shown in Figure 2, acts to bring the widest portions of the cam between the levers 13 and 14, spreading them apart and moving the rollers 8 and 9 away from the pulley 7, thus permitting easy insertion of the tape around the pulley.

In order to maintain the paper tape sufficiently tight across the table 5, a shoe 25 carried by a flat spring 26 presses against the tape opposite to the first roller 6, the pressure with which the shoe 25 bears on the tape being adjustable by manipulation of a screw 27 threaded through a boss 28 and having its inner end bearing against the outer face of the spring 26.

A recording pen 30 may be employed to mark the occurrences of the heart beats on the tape while it is passing over the table 5. An ordinary fountain pen may be used for this purpose, if desired. This is shown as having its rear end portion pivoted as at 31 to a supporting post 32 and having connected to a surrounding band at an intermediate portion of its length, a link 33, and the opposite end of which is pivoted to an armature 34. This armature is pivoted at 35 to one pole of an electromagnet having a core 36 which extends through a magnetic coil which constitutes the load 10 of the trigger circuit. This pen 30 is normally held as by a spring 37 reacting between a fixed support 38 and the short arm of the armature 34 so that as it bears lightly upon the paper strip, it normally draws a straight line thereon as indicated at a in Figure 3. Whenever the trigger circuit is actuated, however, the armature 34 is drawn into contact with the opposite end of the core 36, causing a lateral jog to be made in the line drawn by the pen as shown at b, the spacing of these jogs b with relation to the spacing of the time indicating perforations c made by the point 11 of the pulley 7, providing a visible indication and record of the timing or frequency of the heart beats.

From the foregoing description of an embodiment of this invention, it will be understood that various changes and modifications might be made without departing from the spirit or scope of this invention.

I claim:

1. An apparatus of the class described comprising a plurality of electrodes adapted to be connected to an organism to take up bio-electrical variable currents and connected to an in-put circuit, said circuit eliminating undesirable frequency components coming from the active potentials of the skin and skeletal muscles and from interfering sources outside the subject, said circuit being connected to the grids of amplifying tubes disposed in balanced arrangement and having associated means to partially suppress pulses arriving at the grids of the tubes in-phase but not suppress pulses that are opposite in phase, and an output transformer for the tubes further suppressing in-phase pulses and having oppositely wound primaries whereby a like change in current does not cause induced potential in the secondary winding, condensers in parallel with said primaries forming parallel resonant circuits constituting the plate loads of said tubes, said tubes having high impedance plate circuits whereby their power output to the load is small except for a narrow band of frequencies near the resonance frequency of the plate loads which latter frequency is that of the electrical impulses developed by the heart muscle.

2. An apparatus according to claim 1 including an output circuit having a plurality of amplifying tubes in which the cathode lead to ground of the tubes is through a common bias resistor functioning both as the output load and as a coupling element for the tubes.

3. An apparatus according to claim 1 including an output circuit having two tubes, the plate of the first tube being coupled to the grid of the second tube by a condenser, the cathode of the second tube being coupled to the cathode of the first tube by a common cathode resistor.

4. An apparatus according to claim 1 including a stage of output amplification including means for rejecting potentials having peak values less than a predetermined value, and a recorder actuable from said stage.

5. An apparatus according to claim 1 in which the output circuit has means for preventing large output potentials from reacting back upon the input circuit.

6. Apparatus comprising a pair of electrodes for application to the body of an animal adjacent to the heart of the animal and a third electrode for application to said body remote from said heart, said electrodes being connected to an input circuit eliminating undesirable frequency components coming from the active potentials of the skin and skeletal muscles and from interfering sources outside the body of the animal, said circuit being connected to the grids of amplifying tubes disposed in balanced arrangement and having associated means to partially suppress pulses arriving in phase at the grids of the tubes from each of said pair of electrodes relative to said third electrode but not suppressing pulses that are opposite in phase, and an output transformer for the tubes further suppressing in-phase pulses and having oppositely wound primaries whereby a like change in current does not cause induced potential in the secondary winding, condensers in parallel with said primaries forming parallel resonant circuits constituting the plate loads of said tubes, said tubes having high impedance plate circuits whereby their power output to the load is small except for a narrow band of frequencies near the resonance frequency of the plate loads which latter frequency is that of the electrical impulses developed by the heart muscle.

VICTOR GUILLEMIN, JR.

REFERENCES CITED

The following references are of record in the file of this patent:

UNITED STATES PATENTS

| Number | Name | Date |
|---|---|---|
| 1,647,710 | Nichols | Nov. 1, 1927 |
| 1,816,465 | Boas | July 28, 1931 |
| 2,150,223 | Hollmann | Mar. 14, 1939 |
| 2,214,299 | Heller | Sept. 10, 1940 |
| 2,255,882 | Hathaway | Sept. 16, 1941 |
| 2,270,012 | Shepard | Jan. 13, 1942 |
| 2,106,287 | Swart | Jan. 25, 1938 |
| 2,194,555 | Keall | Mar. 26, 1940 |
| 2,124,208 | Paully | July 19, 1938 |
| 2,241,619 | Sherman | May 13, 1941 |
| 2,120,823 | White | June 14, 1938 |
| 1,888,139 | Nichols | Nov. 15, 1932 |
| 1,792,970 | Drake et al. | Feb. 17, 1931 |

FOREIGN PATENTS

| Number | Country | Date |
|---|---|---|
| 449,686 | British | July 1, 1936 |
| 441,057 | British | Jan. 13, 1936 |
| 108,154 | Australian | Aug. 4, 1937 |

OTHER REFERENCES

Electrical Engineering, Transactions, Jan. 1940, pp. 60–64.